United States Patent [19]

MacWilliam

[11] Patent Number: 5,344,221
[45] Date of Patent: Sep. 6, 1994

[54] ANTI-THEFT METHOD AND APPARATUS FOR LOCKING THE BRAKES OF A VEHICLE

[76] Inventor: Mark W. MacWilliam, 419 Dovercourt Road, Toronto, Ontario, Canada, M6J 3E8

[21] Appl. No.: 9,666
[22] Filed: Jan. 27, 1993
[51] Int. Cl.⁵ ............................................. B60T 17/16
[52] U.S. Cl. ................................... 303/89; 188/353; 137/354; 137/384.8; 137/385; 137/864; 137/865
[58] Field of Search ................. 303/75, 89, 84.1, 84.2; 188/265, 353; 137/864, 865, 385, 384.8, 354; 251/84; 180/287

[56] References Cited

U.S. PATENT DOCUMENTS

| | | | |
|---|---|---|---|
| 3,625,573 | 12/1971 | Conn | 188/353 X |
| 3,885,586 | 5/1975 | Tibbetts | 137/354 |
| 4,429,711 | 2/1984 | Schomer | 137/385 |
| 5,163,741 | 11/1992 | Hsiu | 303/89 |

Primary Examiner—Robert J. Oberleitner
Assistant Examiner—Josie A. Ballato
Attorney, Agent, or Firm—Shoemaker & Mattare, Ltd.

[57] ABSTRACT

An anti-theft device is installed in a vehicle brake line which carries braking fluid. The device defines a valve seat and a valve body adapted to close against said valve seat, the valve body having a passageway therethrough and being rotatable against said seat about an axis substantially perpendicular to the passageway, between a first position in which it permits fluid flow in one direction and inhibits fluid flow in the opposite direction, and a second position in which it permits fluid flow in both directions. The valve can easily be switched between the first and second positions, and can be locked in the first position. By allowing braking fluid to flow only toward the wheels, it will be evident that the wheel brakes, once applied, cannot, be released.

21 Claims, 2 Drawing Sheets

ANTI-THEFT METHOD AND APPARATUS FOR LOCKING THE BRAKES OF A VEHICLE

This invention relates to anti-theft devices and, in particular, to a device by which vehicle theft is prevented through locking the vehicle brakes.

BACKGROUND OF THIS INVENTION

Although a number of different anti-theft devices have been devised for automobiles, there remains a need for a simple, fool-proof but inexpensive mechanism which can be installed as original equipment in a new car, or can be retrofitted into existing cars.

GENERAL DESCRIPTION OF THIS INVENTION

The essential principle of the device described below is the concept of blocking the hydraulic brake system in such a way that the brakes cannot be released except with a special key. Once the brakes are locked in the "on" condition, the vehicle cannot be moved. Where all four wheels are locked against rotation, the vehicle cannot be removed without damage, even by a tow-away truck that utilizes a rig for raising one end of the vehicle off the ground.

More particularly, this invention provides an anti-theft apparatus for a wheeled vehicle, the vehicle including a wheel-locking system having at least one conduit for braking fluid such that a) when the fluid moves in one direction in said conduit the brakes are applied, and b) when the fluid moves in the opposite direction in said conduit the brakes are released; said apparatus comprising:

A) valve means including:
   recess means defining a valve chamber,
   within said chamber a valve seat surrounding a passageway,
   a valve member defining a surface which is radially symmetrical about an axis of symmetry, said surface seating against said valve seat, said valve member having internal passage means and being rotatable about said axis of symmetry between 1) a first position in which it blocks fluid flow from said chamber to said passageway and functions as a one-way check-valve, and 2) a second position in which it permits fluid flow in both directions said passage means between said chamber and said passageway,
   and resilient means for urging said valve member against said valve seat,
B) connecting means adapted to permit the apparatus to be installed in said braking fluid conduit such that when the braking fluid moves in said one direction it passes from said passageway to said chamber, and when the braking fluid moves in said opposite direction it passes from said chamber to said passageway, and
C) locking means operatively associated with said valve member and adapted a) to move said valve member between said first and second positions, and b) to lock said valve member in said first position.

Further, this invention provides an anti-theft apparatus for installation in a vehicle brake line carrying braking fluid, the apparatus including a valve incorporating a substantially radially symmetrical value member with an open-ended passage, the valve member being rotatable, about a diametral axis substantially perpendicular to said passage, between a first position in which it permits fluid flow in one direction through the valve and inhibits fluid flow in a direction opposite said one direction, and a second position in which it permits fluid flow along said passage in both directions; and a locking means for switching the valve members between said first and second positions, and for locking the valve members in said first position.

GENERAL DESCRIPTION OF THE DRAWINGS

One embodiment of this invention, and a variant thereof, we illustrated in the accompanying drawings, in which like numerals denote like parts throughout the several views, and in which.

DETAILED DESCRIPTION OF THE DRAWINGS

Figure 3:
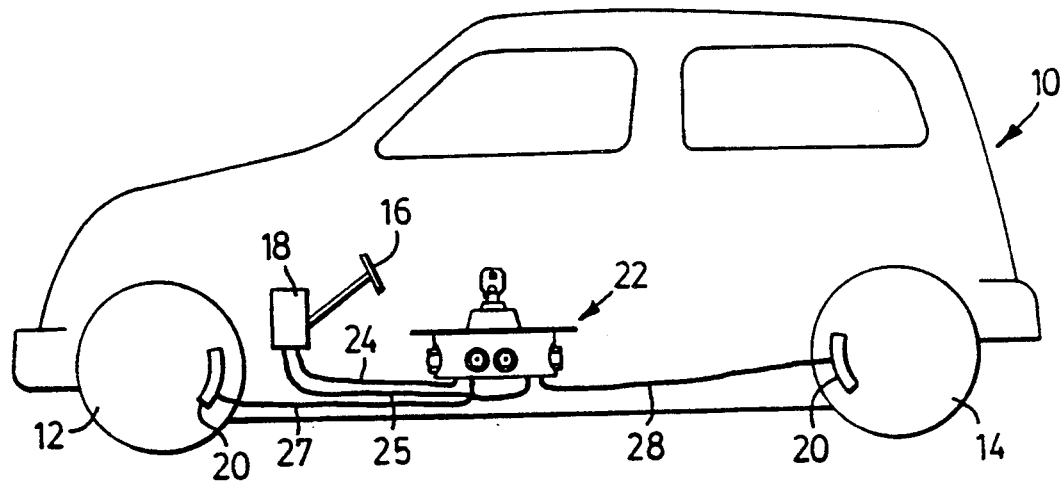
FIG. 3 is a schematic elevational view of an automobile in which this invention has been installed.

Attention is first directed to FIG. 3, which shows in schematic outline an automobile 10 with front wheels 12 and rear wheels 14 (each illustrated wheel hiding the equivalent wheel on the other side). FIG. 3 also shows a brake pedal 16 and a conventional brake cylinder 18. Normally, the high-pressure output from the brake cylinder 18 is fed through four lines going to the braking mechanisms for each of the four wheels, the braking mechanisms being illustrated in the schematic FIG. 3 as arcuate portions 20. However, as illustrated in FIG. 3, the lines from the brake cylinder 18 go first to a lock assembly 22, from which individual lines proceed to the braking mechanisms 20 for the wheels. In FIG. 3, which only shows two of the wheels of the vehicle, only two lines are illustrated proceeding from the brake cylinder 18. These lines are numbered 24 and 25. Further lines 27 and 28 proceed from the lock assembly 22 to the brake mechanisms 20 of the wheels 12 and 14.

It will be understood that, since the vehicle has four wheels, there will in fact be four feed lines from the braking cylinder 18 to the lock assembly 22, and four further lines proceeding from the lock assembly 22 to the four wheels.

Figure 1:
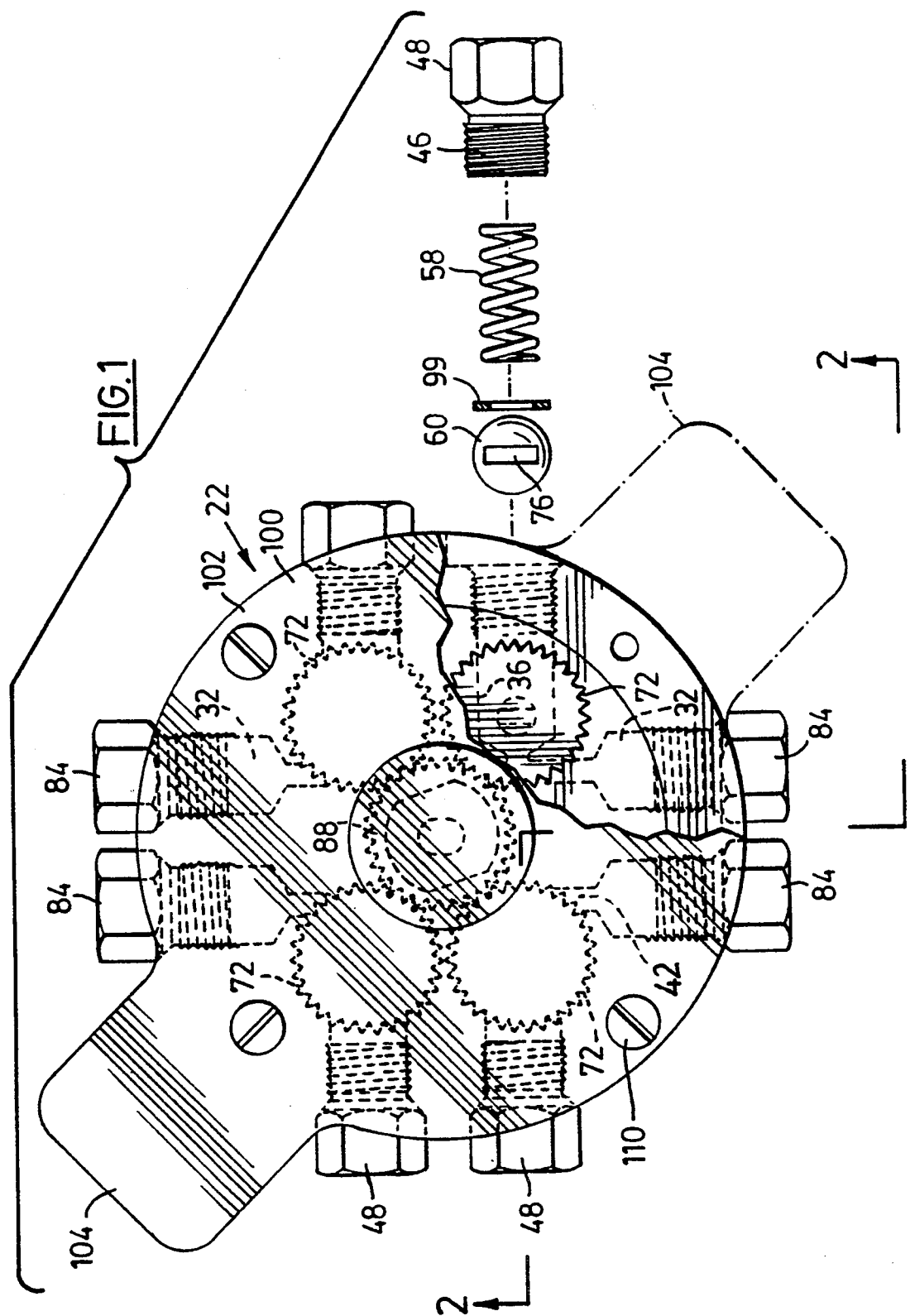
FIG. 1 is a partly-exploded plan view of an anti-theft apparatus constructed in accordance with this invention.
Figure 2:
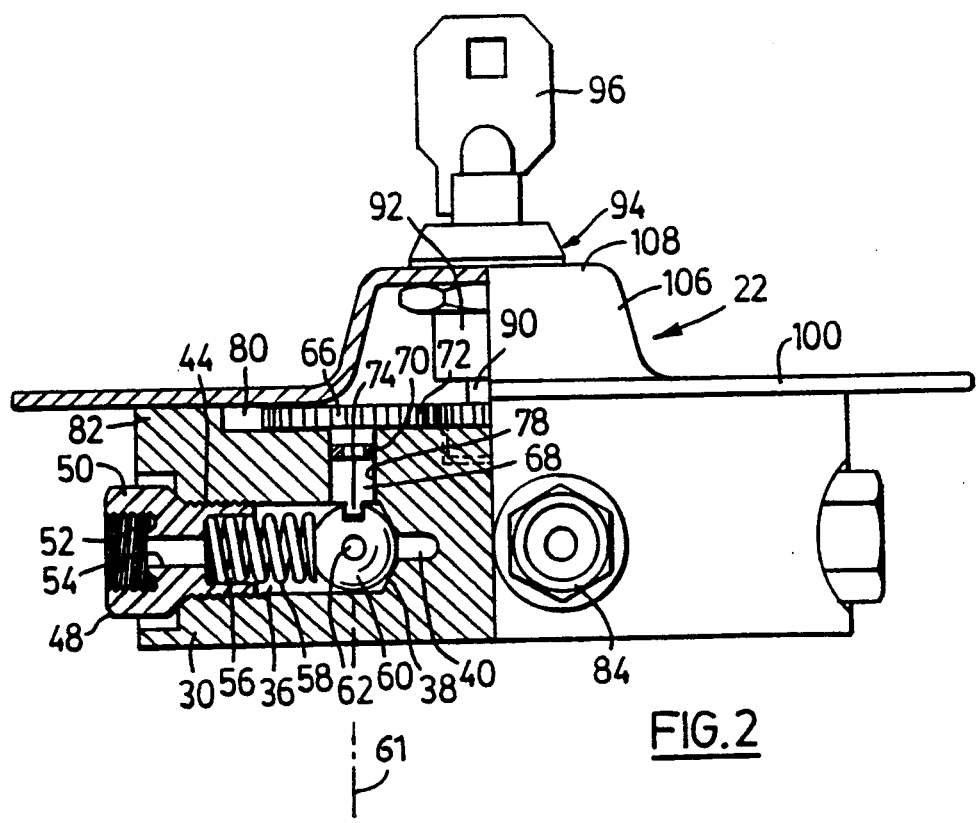
FIG. 2 is a part section and part elevational view along the line 2—2 in FIG. 1.

Attention is now directed to FIGS. 1 and 2, with the help of which the particular construction of the lock assembly 22 will be described.

The lock assembly 22 includes a solid body 30 which is drilled and tapped to provide four inlet recesses 32 (seen in broken lines in FIG. 1), and four outlet recesses 36 (seen in broken lines in FIG. 1 and in solid lines at the left in FIG. 2).

As best seen at the left in FIG. 2, each outlet recess 36 is in the form of a horizontal bore having tapered flanks 38 at the inner end which define a conical valve seat. The valve seat 38 surrounds a passageway 40 which communicates with one of the inlet recesses 32 along a passageway 42 (seen in broken lines in FIG. 1).

Each outlet recess 36 has an internal helical thread 44 adapted to be engaged by the external thread 46 of a fitting 48, the latter being of conventional construction and being adapted for leak-type connection to a hydraulic pressure line of the kind which carries pressurized braking fluid from the braking cylinder to a wheel brake in a conventional automobile. To this end, the fitting 48 has a widened end portion 50 with an internally threaded recess 52 and an internal bore 54 for communication with the recess 36. Also, the fitting 48 has a non-threaded internal recess 56 adapted to receive one end of a compression coil spring 58. The other end of the compression coil spring 58 bears directly against a ball valve 60 which constitutes a valve member adapted to seat against the valve seat 38. The ball valve 60 has an internal, diametral passage 62, which in FIG. 2 lies at right angles to the drawing sheet. It can be easily visualized that, with the ball valve 60 in the position shown in FIG. 2, pressurized fluid entering the chamber 36 will be prevented from passing into the passageway 40 because the pressure in chamber 36 will urge the ball valve 60 against the opening leading to the passageway 40, thus sealing it. However, if the ball valve 60 were to be rotated through 90° about a vertical axis 61, such that the passage 62 were in alignment with the axis of the chamber 36, the passage 62 would permit fluid from the chamber 36 to enter the passageway 40 and move toward the corresponding recess 32 shown in broken lines in FIG. 1.

A mechanism is provided for moving the valve member (ball valve 60) between a first position in which it blocks communication between the chamber 36 and the passageway 40 (illustrated in FIG. 1), and a second position in which it permits communication, along the passage 62, between the chamber 36 and the passageway 40. Hence, with the ball valve 60 in the position shown in FIG. 2, the valve 60 acts as a one-way check valve allowing fluid movement only in the direction from the passageway 40 to the chamber 36. By contrast, with the ball valve in the second position (passage 62 aligned with the axis of the chamber 36), fluid can pass without hindrance in both directions: either from the passageway 40 into the chamber 36, or in the reverse direction.

Locking means are provided and are operatively associated with the ball valve 60 such as to move the ball valve 60 between the first and second positions defined above. Further, the locking means is capable of releasably locking the valve 60 in the first position (that shown in FIG. 2).

As seen in FIG. 2, the locking means includes firstly (for each ball valve 60) a rotary member 66 in which includes a shaft 68 having a circumferential groove for receiving an O-ring 70, and an integral gear 72. At its lower end, the shaft 68 is machined to provide a diametral, downwardly projecting tongue 74 adapted to be received in a corresponding slot 76 in the ball valve 60 (see FIG. 1).

The body 30 is machined to provide a vertical bore 78 adapted to snugly receive the shaft 68, while permitting the shaft 68 to rotate. The body 30 also defines an upper, central, circular recess 80 in which the gear 72 is received. The body 30 provides an upstanding ledge 82 surrounding the recess 80. It will be noted that the recess 80 is slightly deeper (in the vertical direction) than the thickness of the gear 72.

Before describing the remainder of the locking means, attention is directed to FIG. 1 toward the bottom, where it can be seen that each inlet recesses 32 is shaped similarly to the outlet recesses 36, except that the inlet recesses 32 are not as long. The inlet recesses 32 do, however, each receive a fitting 84 substantially identical to the fittings 48. It will be clear that, in connecting this apparatus to the braking system, each hydraulic line which normally would run from the braking cylinder to one of the wheel brakes is "broken" at an intermediate location. The portion leading back to the brake cylinder is connected to one of the fittings 84, while the part leading to the wheel brake is connected to the corresponding fitting 48.

The gear 72 illustrated in FIG. 2 is seen in FIG. 1 as the gear 72 at lower left, and is only one of four identical such gears (all likewise numbered 72). All of the gears 72 constitute "planetary" gears which mesh with a "sun" gear 88 that is integral with an upstanding post 90 received in a lock cartridge 92 which forms part of a conventional key-operated lock 94.

It will thus be seen that, so long as the planetary gears 72 are engaged with the sun gear 88 in positions which correspond to the orientation of the respective passageways 62 at right angles to the axes of the respective recesses 36, and so long as all of the planetary gears 72 are the same size (have the same number of teeth), then rotation of the sun gear 88 will cause all of the ball valves 60 to rotate in concert. In this manner, there will be a first position for the sun gear 88 which corresponds to the regular "check valve" function of the ball valves 60 and another position of the sun gear 88 which corresponds to a situation in which the passages 62 are in alignment with the axes of the respective recesses 36, thus allowing fluid movement in either direction past the ball valves 60. It is to be noted that the engagement of each tongue 74 with each slot 76 is loose enough to allow the ball valve 60 to move away from the valve seat 38 under fluid pressure, thus acting like a true check-valve.

By making the sun gear 88 the same size (same number of teeth) as the planetary gears 72, a 90° rotation of the sun gear 88 will cause 90° rotations of all of the planetary gears 72 in tandem.

FIG. 2 shows a key 96 which cooperates with the locking cylinder 92 to rotate the sun gear 88 between its two positions. The key can be removed in either of the two positions.

A slight variant of the construction for this apparatus is shown in FIG. 1 at the right, where an annular washer 99 is interposed between the compression coil spring 58 and the respective ball valve 60.

Returning to FIG. 2, it will be seen that the assembly is completed by the provision of a coveting member 100 which consists of a circular central portion 102 having diametrally opposed flanges 104, and further having a central, upset cap portion 106 to which the lock 94 is mounted. The covering member 100 is secured in place by a plurality of fasting bolts 110 engaging threaded bores in the body 30 (bores not illustrated)

As previously mentioned, the apparatus of this invention may either be provided as part of the original equipment of a vehicle, or be retrofitted to an existing vehicle. In either case, the operation is the same. Preferably, the unit is installed through the floor of the vehicle and is located to one side of the driver's seat. It is also preferable that only the cap portion 106 and the associated lock mechanism project upwardly through the floor. This would mean that the flanges 104 are located either under the metal floor, or between the latter and the carpeting. The flanges 104 are useful for securing the apparatus to the floor.

The apparatus of this invention has two modes of use. In the first mode, the driver brings the automobile to a stop at the location where it is to be parked. The driver then applies the foot brake hard and then turns the key 96 to the "locked" position, in which the ball valves 60 are oriented so as not to provide communication between the inlet and outlet recesses through the passages 62. The result will be that the fluid which has been moved toward the wheel brakes will not be able to retrace its path, and the wheel brakes will remain "on". This situation will make the car impossible to drive, even if the would-be thief were able to start the engine.

The second mode of operation is one in which the driver brings the automobile to a stop, but does not apply the foot brakes prior to turning the key 96 to the "locked" position. This will mean that a would-be thief who breaks into the car and starts the engine will be able to drive the car away. The car will continue to move until the first time the thief puts on the brakes. He will find that, even when he releases the brake pedal 16, the wheels remain locked. This mode may be of some advantage where the owner of the vehicle leaves it parked in an out-of-the-way location such as a secluded laneway, behind a building, etc. Parked automobiles in such unfrequented locations are more likely to be broken into or stolen than automobiles parked on a busy street where other motorists and pedestrians can easily see it. By utilizing this second mode of operation, there is a possibility that the thief will not have to apply the brakes until he has driven the car out of the secluded area and into a busier area. This will mean that the thief will discover a "problem" with the brakes at a location where he does not want to be seen trying to fix the automobile. It is thus likely that he would simply run away, leaving the automobile in the "locked" condition.

It is contemplated to operate this unit utilizing a Yale-type lock and key device, which are readily available on the market. A typical such device has 19000 variable combinations available.

It will be noted that the unit provided herein does not interfere in any way with the manufacturer's original braking system. The unit is purely an adjunct device fitting between the master brake cylinder and the wheels.

While one embodiment of this invention has been illustrated in the accompanying drawings and described hereinabove, it will be evident to those skilled in the art that changes and modifications may be made therein without departing from the essence of this invention, as set forth in the appended claims.

The embodiments of the invention in which an exclusive property or privilege is claimed are defined as follows:

1. An anti-theft apparatus for a wheeled vehicle, the vehicle including a wheel-braking system having at least one conduit for braking fluid such that a) when the fluid moves in one direction in said conduit the brakes are applied, and b) when the fluid moves in the opposite direction in said conduit the brakes are released; said apparatus comprising:

A) valve means including:
  recess means defining a valve chamber,
  within said chamber a valve seat surrounding a passageway,
  a valve member defining a surface which is radially symmetrical about an axis of symmetry, said surface seating against said valve seat, said valve member having internal passage means and being rotatable about said axis of symmetry between 1) a first position in which it blocks fluid flow from said chamber to said passageway and functions as a one-way check valve, and 2) a second position in which it permits fluid flow in both directions along said passage means between said chamber and said passageway,
  and resilient means for urging said valve member against said valve seat, B) connecting means adapted to permit the apparatus to be installed in said braking fluid conduit such that when the braking fluid moves in said one direction it passes from said passageway to said chamber, and when the braking fluid moves in said opposite direction it passes from said chamber to said passageway, and C) locking means operatively associated with said valve member and adapted a) to move said valve member between said first and second positions, and b) to lock said valve member in said first position.

2. The combination of the apparatus claimed in claim 1 with a vehicle having a brake cylinder and at least one wheel brake, said conduit communicating said cylinder with said wheel brake.

3. An anti-theft apparatus for installation in a vehicle brake line carrying braking fluid, the apparatus including a valve incorporation a substantially radially symmetrical valve member with an open-ended passage, the valve member being rotatable, about a diametrical axis substantially perpendicular to said passage, between a first position in which it permits fluid flow in one direction through the valve and inhibits fluid flow in a direction opposite said one direction, and a second position in which it permits fluid flow along said passage in both directions; and a locking means for switching the valve member between said first and second positions, and for locking the valve member in said first position.

4. The apparatus claimed in claim 3, in which the valve comprises:
  recess means defining a valve chamber,
  within said chamber a valve seat surrounding a passageway,
  valve member seating against said valve seat,
  and resilient means for urging said valve member against said valve seat.

5. The apparatus claimed in claim 4, in which the valve member is a substantially spherical member, and in which said internal passage is a substantially diametral bore through the spherical member.

6. The apparatus claimed in claim 4, in which said first and second positions are substantially 90 degrees apart rotationally, and in which said locking means comprises:
  a rotary member mounted for rotation about a swivel axis, the rotary member engaging said valve member such that rotation of the rotary member about the swivel axis causes equivalent rotation of the valve member, said locking means being adapted to rotate said rotary member and to lock the rotary member in a configuration corresponding to said first position of the valve member.

7. The apparatus claimed in claim 3, in which the apparatus includes additional valves, thus allowing the apparatus to control a plurality of brake lines simultaneously, said locking means being operatively connected to all said valves such that the corresponding valve members are switched simultaneously between respective first and second positions, and such that all valve members can be locked simultaneously in their respective first positions.

8. The apparatus claimed in claim 7, in which each valve comprises:
recess means defining a valve chamber,
within said chamber a valve seat surrounding a passageway,
said valve member seating against said valve seat,
and resilient means for urging said valve member against said valve seat.

9. The apparatus claimed in claim 8, in which each valve member is a substantially spherical member, and in which each internal passage is a substantially diametral bore through the respective spherical member.

10. The apparatus claimed in claim 8, in which said first and second positions are substantially 90 degrees apart rotationally, and in which said locking means comprises:
a plurality of rotary members mounted for rotation about respective swivel axes, the rotary members engaging respective valve members such that rotation of the rotary members about their respective swivel axes causes equivalent rotation of the respective valve members, said locking means being adapted to cause simultaneous rotation of said rotary members and to lock the rotary members simultaneously in configurations corresponding to said first position of the valve members.

11. The apparatus claimed in claim 10, in which them are four vehicle brake lines, and for each line a valve, the rotary members being planetary gears meshing with a central sun gear constituting part of said locking means.

12. The apparatus claimed in claim 10, in which each valve member is a substantially spherical member, and in which each said internal passage is a substantially diametral bore through the respective spherical member.

13. The combination of the apparatus claimed in claim 3 with a vehicle having a brake cylinder and at least one wheel brake, said brake line communicating said cylinder with said wheel brake.

14. The combination claimed in claim 13, in which the valve member is a substantially spherical member, and in which said internal passage is a substantially diametral bore through the spherical member.

15. The combination claimed in claim 14, in which said first and second positions are substantially 90 degrees apart rotationally, and in which said locking means comprises:
a rotary member mounted for rotation about a swivel axis, the rotary member engaging said valve member such that rotation of the rotary member about the swivel axis causes equivalent rotation of the valve member, said locking means being adapted to rotate said rotary member and to lock the rotary member in a position corresponding to said first position of the valve member.

16. The combination claimed in claim 13, in which the vehicle has four wheel brakes, for each of which there is a valve, thus allowing the apparatus to control four brake lines simultaneously, said locking means being operatively connected to all valves such that all valve members are switched simultaneously between resistive first and second positions, and such that all valve members can be locked simultaneously in their respective first positions.

17. The combination claimed in claim 16, in which each valve comprises:
recess means defining a valve chamber,
within said chamber a valve seat surrounding a passageway,
said valve member seating against said valve seat,
and resilient means for urging said valve member against said valve seat.

18. The combination claimed in claim 17, in which each valve member is a substantially spherical member, and in which each internal passage is a substantially diametral bore through the respective spherical member.

19. The combination claimed in claim 17, in which said first and second positions are substantially 90 degrees apart rotationally, and in which said locking means comprises:
four rotary members mounted for rotation about respective swivel axes, the rotary members engaging respective valve members such that rotation of the rotary members about their respective swivel axes causes equivalent rotation of the respective valve members, said locking means being adapted to cause simultaneous rotation of said rotary members and to lock the rotary members simultaneously in positions corresponding to the first positions of the valve members.

20. The combination claimed in claim 19, further including a sun gear, the rotary members being planetary gears meshing with said sun gear, the sun gear constituting part of said locking means, said locking means further including a lock and key, the key being adapted to rotate the sun gear when inserted in the lock, and being removable when the valve members are in their respective first positions.

21. The combination claimed in claim 19, in which each valve member is a substantially spherical member, and in which each said internal passage is a substantially diametral bore through the respective spherical member.

* * * * *